June 11, 1935. B. J. SINNAEVE 2,004,353
CABLE SUPPORTING CLIP FOR CHASSIS AND BODY
Filed April 14, 1934
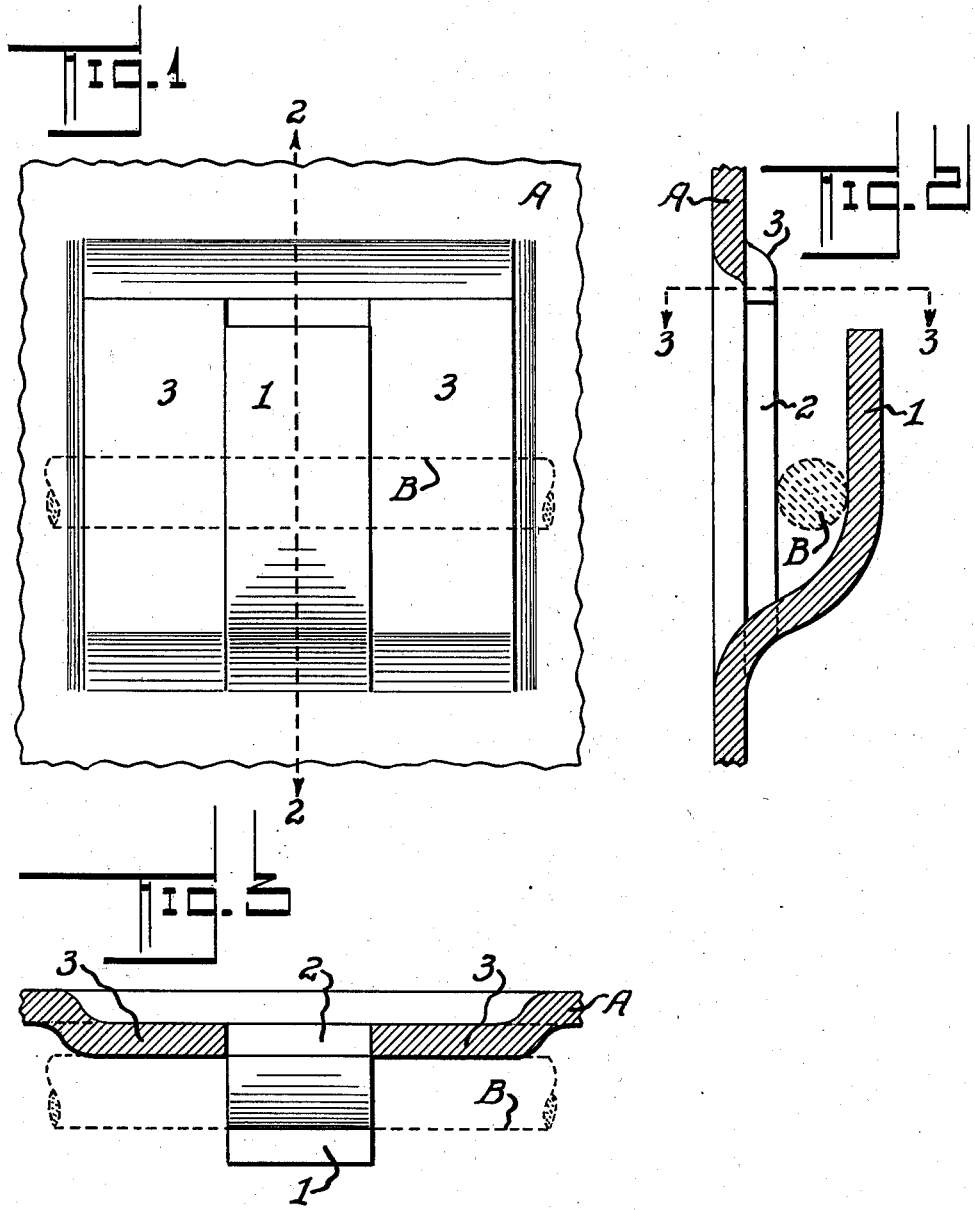

Patented June 11, 1935

2,004,353

UNITED STATES PATENT OFFICE 2,004,353

CABLE SUPPORTING CLIP FOR CHASSIS AND BODY

Baldwin J. Sinnaeve, Detroit, Mich.

Application April 14, 1934, Serial No. 720,524

2 Claims. (Cl. 280—106)

In the industry where various type of chassis are constructed and employed, and particularly the automobile industry, it is quite usual that a certain amount of conduits, tubing or cables, is necessarily associated with the chassis. For this purpose there must be a method for carrying said lines of conduits, cable, tubing and the like along the frame of the chassis to the connecting point or prearranged destination. The most commonly known channel for this requirement is the automobile chassis, and the method for supporting the various lines is an independently made clip that is secured to the chassis and body of the automobile by means of rivets, screws or otherwise.

The primary intention of my invention is to provide any number of clips for this purpose and spaced in desirable locations about the chassis and body, and this is readily accomplished by piercing a portion of the metal of the chassis and also of the metal framework of the body, and thereby deflecting the metal at this point so as to form an upturned ear with an opening at the top thereof so as to receive the cable or the like and forming thereby a suitable clip for this purpose.

Another object of the invention is to have a portion of the metal at each side of said ear, somewhat deflected so that when the cable or the like engages said ear the last-named deflected portions of the metal will space the cable or the like from the chassis frame or body, and positively preventing thereby, rubbing of the same with said cable or the like. Frictional contact by rubbing of wires and the like against the metal of the chassis frequently cause a short circuit, and other material, such as cables or tubing, from this cause frequently become badly worn in places so as to render them weak and greatly impairing the function of the particular line affected.

In the present method of clips for the purpose there is no provision whereby the clips retain these lines so that they clear the metal of the chassis or body and avoid the frictional difficulty, and it is this condition that my invention completely and unquestionably overcomes and improves.

The invention possesses further advantages, which will become readily apparent during the course of the following detailed description, throughout the accompanying drawing, and more specifically pointed out in the appended claims.

With reference to the drawing:

Figures 1, 2 and 3 are views of the invention drawn to a slightly oversize scale; and Figure 1 is a front elevation of the invention and showing the same normally in use upon the chassis or body.

Figure 2 is a vertically disposed section taken directly upon line 2—2 of Figure 1.

Figure 3 is a top plan view of the invention taken directly at the position of line 3—3 of Figure 2.

The metal panel of the chassis or body is indicated throughout the drawing by the letter A, and it is an object of the invention to provide upturned ear 1 by piercing the metal of the panel A through portion 2, thereby forming said ear as clearly indicated in Figure 2.

A very important feature of the invention is the provision of a positive method for clearing cable B from the face of the panel A, and this is effectively accomplished by deflecting the metal of portion 3, which is at each side of ear 1 as indicated, and it is to be distinctly understood that portions 3 are formed simultaneously with ear 1, consequently the entire invention being so readily made it is apparent that this advantage would effect a decided economy in labor and time, in the manufacturing process of the chassis and body, and with the added feature of adequately protecting the cable or the like from frictional wear and disturbance of the lines from this cause.

Having thus described my invention, what I claim as new is:

1. An automobile chassis including as a side of the frame thereof, a flat panel member having an outwardly pressed area, and a cable supporting tongue struck out from the intermediate portion of the outwardly pressed area, the portions of the outwardly pressed area on opposite sides of the tongue spacing the cable from the face of the panel.

2. An automobile chassis including as a side of the frame thereof, a flat panel member having an outwardly pressed area, and a cable supporting tongue struck out from the intermediate portion of the outwardly pressed area and disposed upwardly, the outer face of the portions of the outwardly pressed area on opposite sides of the tongue spacing the cable from the face of the panel, the arm of the tongue and the aforesaid portions of the outwardly pressed area lying in planes parallel with the plane of the face of the panel.

BALDWIN J. SINNAEVE.